United States Patent [19]

Sugiura et al.

[11] Patent Number: 4,656,217
[45] Date of Patent: Apr. 7, 1987

[54] REACTIVE POLYMER, METHOD FOR MANUFACTURING THEREOF AND USE THEREOF

[75] Inventors: Shiro Sugiura, Nishinomiya; Yoshikuni Mori, Settsu; Masatoshi Yoshida, Suita; Ryoichi Oshiumi, Ibaragi, all of Japan

[73] Assignee: Nippon Shokubai Kagaku Kogyo Co. Ltd., Osaka, Japan

[21] Appl. No.: 614,467

[22] Filed: May 25, 1984

[30] Foreign Application Priority Data

May 31, 1983 [JP] Japan .................................. 58-94994
May 31, 1983 [JP] Japan .................................. 58-94995

[51] Int. Cl.$^4$ .......................... C08J 3/28; C08K 3/20; C08L 67/00
[52] U.S. Cl. .................................. 524/430; 522/149; 522/151; 524/437; 524/504; 524/516; 525/63; 525/73; 525/279

[58] Field of Search ............... 525/279, 203, 445, 175, 525/63, 73; 524/516, 504, 430, 437; 522/149, 151

[56] References Cited

U.S. PATENT DOCUMENTS 3,974,131   8/1976   Puskas et al. ...................... 525/203

*Primary Examiner*—Allan M. Lieberman
*Attorney, Agent, or Firm*—Omri M. Behr

[57] ABSTRACT

A method for the manufacture of a reactive polymer, which comprises causing (A) a polymer containing a free carboxylic group in an acid equivalent in the range of 0.01 to 5 milliequivalent/g and (B) an unsaturated aziridine compound possessing one aziridinyl group and at least one radically polymerizable unsaturated group in the molecular unit thereof to react with each other in proportions such that the amount of said unsaturated aziridine compound falls in the range of 0.05 to 1.2 mole per 1.0 mole of said free carboxylic group of said polymer at a temperature in the range of 40° to 150° C., and the reactive polymer obtained by such method.

43 Claims, No Drawings

REACTIVE POLYMER, METHOD FOR MANUFACTURING THEREOF AND USE THEREOF

BACKGROUND OF THE INVENTION

1. Field of the Invention

This invention relates to a novel reactive polymer, a method for the manufacture thereof and use thereof. More particularly, this invention relates to a reactive polymer obtained by causing an unsaturated aziridine compound possessing one aziridinyl group and at least radically polymerizable unsaturated group to react with polymer containing a free carboxylic group, to a method for the manufacture of the reactive polymer and use of the reactive polymer.

2. Description of the Prior Art

The term "reactive polymer" as used in this specification means a polymer which possesses a reactive group "capable of inducing the so-called radical reaction or participating in this reaction" owing to the action of heat, ultraviolet light, electrom beam, a free radical generator or the like.

A few reactive polymers of this nature have been suggested to date. One of them makes use of the so-called esterification reaction. For example, the reactive polymers obtained by the method which makes use of the reaction of polymers containing a free carboxylic group with an unsaturated hydroxyl compound or unsaturated glycidyl compound or the reaction of polymers containing a hydroxyl group or glycidyl group with an unsaturated carboxylic acid compound have been known to the art. The esterification reaction, however, is liable to entail side reactions such as the polymerization of an unsaturated group because the reactants are generally held under harsh temperature conditions for a fairly long time. As means for diminishing this hazard, moderation of reaction conditions as by addition of a large amount of a polymerization inhibitor to or introduction of oxygen into the reaction system or use of an esterification catalyst in the reaction system has found recognition. The reactive polymers obtained from such a reaction system often contain excess polymerization inhibitor or residual catalyst. These extraneous substances possibly cause coloration and retardation of reaction. Thus, the reactive polymers are of poor quality.

Besides, use of the carbamate reaction has been proposed. For example, the reactive polymers obtained by combining polymers possessing a hydroxyl group with an unsaturated hydroxyl compounds through the medium of a diisocyanate compound have been known to the art. Again in the case, use of a catalyst typically of an organic tin compound is nesessary for the promotion of the reaction and, moreover, selective reaction between the hydroxyl group of the polymer and the hydroxyl group of the unsaturated compound and between one of the isocyanate groups of the diisocyanate compound and the other isocyanate group is difficult to accomplish. To enhance the selectivity of the reaction, the plurality of steps of the reaction must be carried out sequentially instead of being performed all at once. This method, therefore, has the disadvantage that the operation of manufacture entails this complexity of the reaction.

As another piece of the prior art, Japanese Patent Publication SHO 57 (1982)-56,507 discloses a method for producing a reactive copolymer by copolymerizing an unsaturated aziridine compound with other copolymerizable monomer to from a copolymer having an aziridinyl group in a side chain thereof and subsequently causing an unsaturated carboxylic acid compound to react upon the aziridinyl group of the copolymer. The production of the reactive polymer by this method, however, has a serious disadvanctage from the practical point of view. Specifically, during the copolymerization of the unsaturated aziridine compound and during the addition reaction of the unsaturated carboxylic acid compound, the reaction system is exposed to harsh conditions such that the ring opening reaction of the aziridinyl group tends to induce an increase of viscosity or, in an extreme case, the phenomenon of gelation. Further, it has been ascertained that the reaction system involved in this method abhors inclusion thereof of water or a compound containing an amino group, a hydroxyl group or a carboxylic group other than the carboxylic group originating in an unsaturated carboxylic acid compound because the presence therof promotes the ring opening of the aziridinyl group. Adoption of this method, therefore, necessitates payment of ample attention to the purification of raw materials and the selection of manufacturing devices. What is more important is the fact that the unsaturated aziridine compound is incapable of copolymerizing with such a monomer as (meth)acrylic acid or hydroxyethyl (meth)acrylate which contains active hydrogen. For those skilled in the art, this method has not proved sufficiently feasible.

An object of this invention, therefore, is to provide a novel reactive copolymer, a method for the manufacture thereof and use thereof.

Another object of this invention is to provide a novel reactive polymer possessing a reactive group "capable of inducing a radical reaction or participating in this radical reaction," a method for the manufacture thereof and use thereof.

SUMMARY OF THE INVENTION

The objects described above are accomplished by a reactive polymer which is obtained by causing (A) a polymer containing a free carboxylic group in an acid equivalent of 0.01 to 5 milliequivalent/g and (B) an unsaturated aziridine compound possessing one aziridinyl gourp and at least one radically polymerizable unsaturated group in the molecular unit thereof to react with each other in proportions such that the amount of the aforementioned unsaturated aziridine compound falls in the range of 0.05 to 1.2 mole per 1.0 mole of the free carboxylic group of the aforementioned polymer.

The aforementioned objects are further attained by a method for the manufacture of a reactive polymer which comprises causing (A) a polymer containing a free carboxylic group in an acid equivalent of 0.01 to 5 milliequivalent/g to react with (B) an unsaturated aziridine compound possessing one aziridinyl group and at least one radically copolymerizable unsaturated group in the molecular unit thereof in proportions having the aforementioned unsatureated aziridine compound in an amount of 0.05 to 1.2 mole per 1.0 mole of the free carboxylic group of the forementioned polymer at a temperature in the range of 40° to 150° C.

These reactive polymers, either alone or in conjunction with a radically polymerizable compound, are combined with a readical polymerization initiator or a photoinitiater to produce compositions useful in a wide range of applications such as adhesive compositions, paints, printing ink vehicles, artificial marble, casting boards, and polymer concrete slabs.

PREFERRED EMBODIMENT OF THE INVENTION

The free carboxylic group-containing polymer (A) to be used in the present invention is a polymer which contains a free carboxylic group in an acid equivalent proportion of 0.01 to 5 milliequivalent/g, preferably 0.02 to 3 milliequivalent/g. Examples of the polymer (A) of the foregoing description include copolymers obtained by polymerizing free carboxylic group-contaning polymerizable monomers such as acrylic acid, methacrylic acid, crotonic acid, itaconic acid, maleic acid and fumaric acid, either independently or in the form of mixtures, with unsaturated monomers copolymerizable with the aforementioned monomers by any of the known methods; polymers enabled to contain therein free carboxylic groups by hydrolyzing homopolymers or copolymers produced by polymerizing by any of known methods those unsaturated monomers capable of forming carboxylic groups on hydrolysis; and polymers enabled to contain therein free carboxylic groups introduced by the use of any of known free carboxylic group-containing polymerization initiators, chain-transfer agents, and polymerization terminators.

Examples of the unsaturated monomer copolymerizable with the aforementioned free carboxylic group-containing polymerizble monomer are esters such as methyl ester, ethyl ester, propyl ester, butyl ester, 2-ethylhexyl ester, hydroxyethyl ester and hydroxypropyl ester of such unsaturated monobasic acids as acrylic acid and methacrylic acid; acrylamide, methacrylamide, corresponding N-substituted acrylamide and methacrylamide; mono- and diesters of such unsaturated dibasic acids as maleic acid and itaconic acid with such lower alkyl alcohols as methyl alcohol, ethyl alcohol and propyl alcohol; and unsaturated monomers such as acrylonitrile, methacrylonitrile, vinyl acetate, vinyl chloride, vinylidene chloride, styrene, ethylene and butadiene. These unsaturated monomers may be used either independently or in the form of mixtures of two or more members.

Other examples of the polymer (A) include polyester polycarboxylic acid obtained by the polycondensation reaction of such polycarboxylic acids such as phthalic anhydride, maleic anhydride, terephthalic acid, trimellitic acid and pyromellitic acid with such polyhydric alcohols as ethylene glycol and propylene glycol; alkyd polycarboxylic acids obtained by the polycondensation reaction of such polyhydric alcohols as glycerine with polycarboxylic acids or fatty acids; polyamide polycarboxylic acids obtained by the polycondensation reaction of polyamines such as ethylene diamine and phenylene diamine with polycarboxylic acids; maleated petroeum resins; starches and celluloses containing a carboxylic group; and polyethylene glycol dicarbolylic acids.

If the amount of the free carboxylic group contained in the polymer (A) is less than 0.01 milliequivalent/g, substantial incorporation of an effective amount of the reactive unsaturated group into the polymer (A) cannot be effected. If this amount exceeds 5 milliequivalent/g, the polymerization system often induces the phenomenon of gelation during the introduction of the reactive unsaturated group and the production of the reactive polymer deviates from the range in which the production safely occurs.

The unsaturated aziridine compound (B) to be used in the present invention is an unsaturated aziridine compound possessing one aziridinyl group and at least one radically polymerizable unsaturated group in the molecular unit thereof. Typically, such unsaturated aziridine compounds as answering the description are represented by the general formula I:

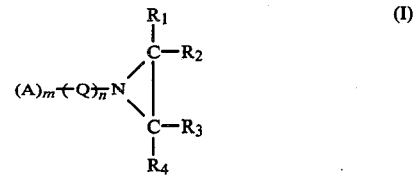

wherein A denotes one group selected from the class consisting of $CH_2=CH-$, $CH_2=C(CH_3)-$, and $CH_2=CH-CH_2-$, m denotes an integer of 1 to 3, n denotes 0 or 1, $R_1$ through $R_4$ independently denote one member selected from the class consisting of hydrogen atom and alkyl groups of 1 to 4 carbon atoms and may be similar or dissimilar to one another, and Q denotes and a multifunctional group of the valency of (m+1).

In the aforementiond general formula I, A preferably denotes $CH_2=CH-$ or $CH_2=C(CH_3)-$ and $R_1$ through $R_4$ desirably denote, independently, hydrogen or an alkyl group of 1 or 2 carbon atoms. The Q which is the multifunctional group having the valency of (m+1) may include hydrocarbon linkage, carboxylic ester linkages, sulfonic ester linkages, ether linkages, urethane linkages, urea linkages, amide linkages, thio amide linkages, carbonyl groups, sulfonyl groups, etc.

The unsaturated aziridine compound (B) are divided by the characteristic of the aziridinyl groups thereof into unsaturated "activated" aziridine compounds (B1) and unsaturated "basic" aziridine compounds (B2) based on a definition of O. C. Dermer and G. E. Ham: "ETHYLENEIMIDE AND OTHER AZIRIDINES CHEMISTRY AND APPLICATIONS" page 106 and 205, Academie Press, New York and London (1969). The unsaturated basic aziridine compounds (B2) are such the nitrogen atom of the aziridinyl group in the molecular unit assumes basicity. Typically, the unsaturated basic aziridine compounds (B2) which answer the description are represented by the general formula II:

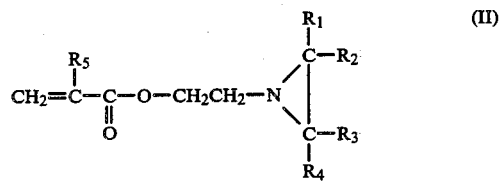

wherein $R_1$ through $R_4$ have the same meanings as above and $R_5$ denotes a hydrogen atom or a methyl group). The unsaturated activated aziridine compounds (B1) are such that the nitrogen atom of the aziridinyl group in the molecular unit does not assume any basicity. Typically, the unsaturated acitvated aziridine compounds (B1) which answer the description are represented by the general formula III:

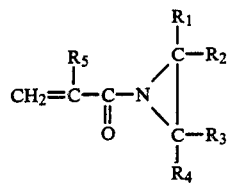

(III)

wherein $R_1$ through $R_5$ have the same meanings as above.

The unsaturated aziridine compounds (B) are divided as described above for the following reason.

The reactive polymer of the present invention is formed by the esterification reaction of the free carboxylic group in the polymer containing a free carboxylic group with aziridinyl group in the unsaturated aziridine compound (B). When an unsaturated basic aziridine compound (B2) is used in this esterification reaction, the aforementioned carboxylic group and the aforementioned aziridine group during the reaction forms a salt and a basic amino group is then formed as the esterification reaction proceeds and, unless a separate acid such as hydrochloric acid or acetic acid is added to the reaction system the basic amino group combines with the other carboxylic group in the copolymer (A) to form a salt and no further esterification from this salt is allowed to proceed. Thus, the esterification reaction in this case is held down to 50% of the theoretical value. When an unsaturated activated aziridine compound (B1) is used in the esterification reaction, since no formation of any basic amono group is entailed, the esterification reaction is allowed to occur theoretically on the whole amount of the carboxylic group present in the aforementioned polymer (A).

In accordance with the definition given above, examples of the unsaturated aziridine compounds usable for the present invention are as follows.

Typical unsaturated activated aziridine compounds (B1) are as follows.

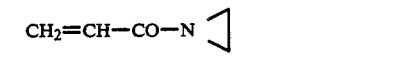

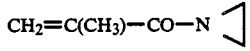

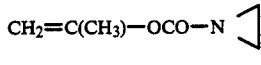

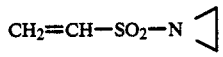

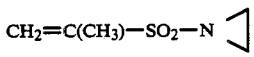

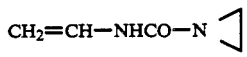

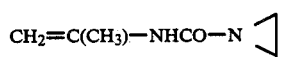

-continued

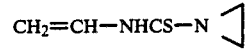

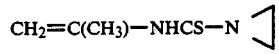

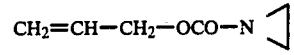

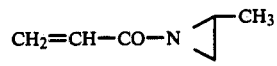

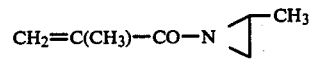

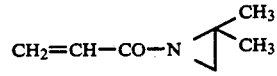

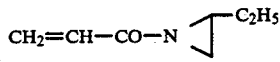

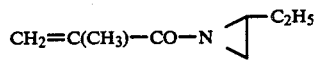

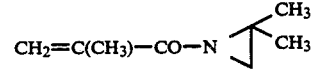

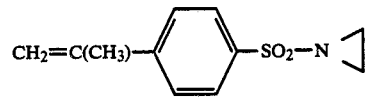

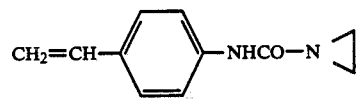

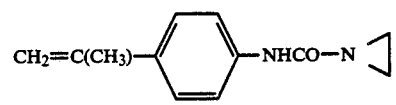

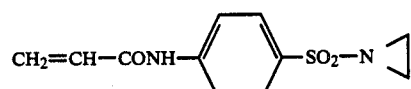

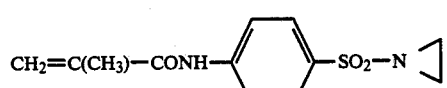

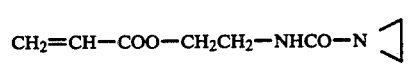

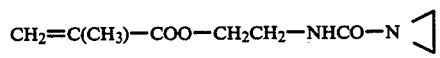

-continued

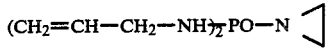

Typical unsaturated basic aziridine compounds (B2) as follows:

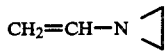

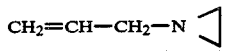

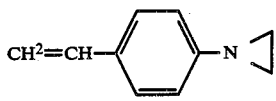

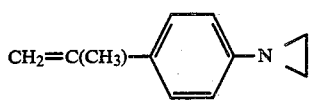

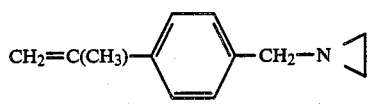

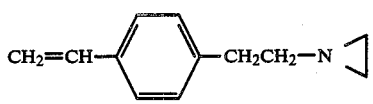

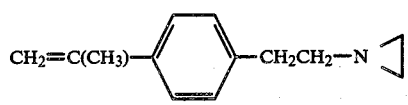

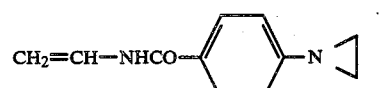

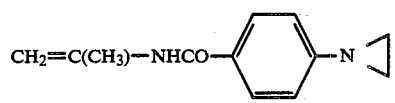

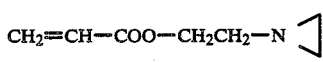

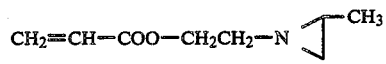

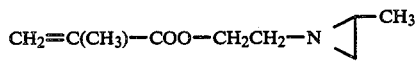

-continued

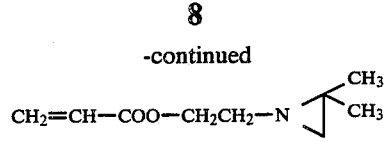

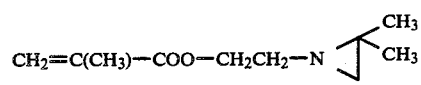

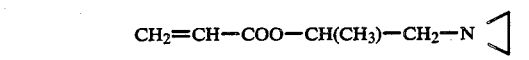

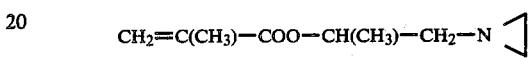

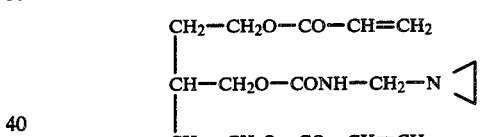

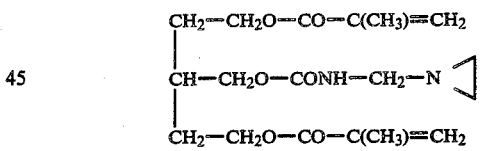

In accordance with this invention, reactive polymers obtained by using unsaturated activated aziridine compounds (B1) form therein an amide nitrogen and, therefore, excel in weatherability and suffer discoloration sparingly. When unsaturated basic aziridine compounds (B2) are used, although their reactivity on carboxylic group-containing polymer (A) is higher than that of unsaturated activated aziridine comounds (B1), reactive polymers consequently obtained form a basic amino group therein and this basic amino group combines with the other free carboxylic group in the aforementioned polymer (A) and gives rise to a salt which tends to obstruct the reaction of the aforementioned carboxylic group with the aziridine group. Further because of this basic amino group, the reactive polymers are liable to be slightly colored. Thus, the present invention also has an object of providing a method for overcoming the disadvantage just mentioned by making the most of the advantage that unsaturated basic aziridine compounds (B2) possess high reactivity relative to the aforementioned polymer (A).

This object is accomplished by additionally using, during the reaction of the free carboxylic group-containing polymer (A) and the unsaturated basic aziridine compound (B2), at least one compound (C) selected from the group consisting of monoisocyanate compounds, monothioisocyanate compounds, ketene compounds and ketene dimers.

For the purpose of the reaction, this compound is advantageously used in an amount of 0.8 to 1.2 mols, preferably 0.9 to 1.1 mols, per mol of the unsaturated basic aziridine compound (B2). When the aforementioned compound (C) is additionally used in the reaction of the aforementioned polymer (A) with the unsaturated basic aziridine compound (B2), it does not retard the reaction between the latter two compounds at all but reacts upon the basic amino group being formed by the reaction between the latter two compounds to decrease or totally eliminate the basic amino group from the reaction system, with the result that the reaction between the free carboxylic group of the aforementioned polymer (A) and the aziridinyl group of the unsaturated basic aziridine compound (B2) is allowed to proceed without experiencing any interference. The reactive polymer consequently obtained, therefore, is notably improved in terms of coloration.

Concrete examples of the compound (C) are monoisocyanates $R_1$—NCO, monothioisocyanates $R_1$—NCS, ketenes $R_2R'_2C=C=O$, and ketene dimers

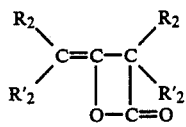

wherein $R_1$ and $R'_1$ independently denote an alkyl of 1 to 12, preferably 1 to 8, carbon atoms, cycloalkyl of 6 to 8 carbon atoms or phenyl, $R_2$ and $R'_2$ independently denote a hydrogen atom or an alkyl of 1 to 8, preferably 1 to 6, carbon atoms, cycloalkyl of 6 to 8 carbon atoms or phenyl. Among these compounds, monoisocyanates, ketenes and ketene dimers are particularly desirable. Typical monoisocyanates are methyl isocyanate, ethyl isocyanate, propyl isocyanate, isopropyl isocyanate, butyl isocyanate, sec-butyl isocyanate, octyl isocyanates, cyclohexyl isocyanate and phenyl isocyanate. Typical monothioisocyanates are methyl thioisocyanate, ethyl thioisocyanate, propyl thioisocyanate, isopropyl thioisocyanate, butyl thioisocynate, sec-butyl thioisocyanate, octyl thioisocyanates, cyclohexyl thioisocyanate and phenyl thioisocyanate. Typical ketenes are ketene, methyl ketene, ethyl ketene, propyl ketene, butyl ketene, octyl ketene, dimethyl ketene, diethyl ketene, dipropyl ketene, dibuyl ketene, methylethyl ketene, methylpropyl ketene, cyclohexyl ketene and phenyl ketene. Typical ketene dimers are ketene dimer, methyl ketene dimer, ethyl ketene dimer, propyl ketene dimer, butyl ketene dimer, dimethyl ketene dimer, diethyl kenete dimer, methylethyl ketene dimer, cyclohexyl ketene dimer and phenyl ketene dimer.

In the present invention, the free carboxylic group-containing polymer (A) and the unsaturated aziridine comound (B) are reacted with each other in proportions such that the amount of the unsaturated aziridine compound (B) falls in the range of 0.05 to 1.2 mole per 1.0 mole of the free carboxylic group of the aforementioned polymer (A). If the amount of the unsaturated aziridine compound (B) is less than 0.05 mole per 1.0 mole of the free carboxylic group, the concentration of the reactive unsaturated group in the consequently produced reactive polymer is too low for the polymer to be feasible. If the amount of the unsaturated aziridine compound (B) exceeds 1.2 mole per 1.0 mole of the aforementioned free carboxylic group, the cleavage reaction of the adjoining aziridine rings proceeds vigorously along with the esterification reaction. The consequently produced reactive polymer rarely proves useful. Preferably in the method for the manufacture contemplated by this invention, the amount of the unsaturated aziridine compound (B) is in the range of 0.05 to 1.2 mole, preferably 0.1 to 1.0 mole in the case of an unsaturated activated aziridine compound (B1) and 0.05 to 1.0 mole, preferably 0.01 to 0.5 mole in the case of an unsaturated basic aziridine compound (B2), respectively per 1.0 mole of the free carboxylic group of the polymer (A).

The esterification reaction used by this invention proceeds even at room temperature, namely at such low temperature as about 20° C. When the unsaturated aziridine compound (B) to be used in the reaction happens to be an unsaturated basic aziridine compound (B2), the esterification reaction performed at a temperature lower than 40° C. is recognized to entail a cleavage reaction of the aziridinyl groups. When this possibility is prominent, the esterification reaction is desired to be carried out at a temperature exceeding 40° C. Further, when the unsaturated aziridine compound (B) to be used in the reaction happens to be an unsaturated activated compound (B1), the esterification reaction performed at a low temperature as about 20° C., but the reaction is desired to be carried out at a temperature exceeding 40° C. considering economical point such as reduction of manufacturing time. The upper limit of the reaction temperature cannot be specified, because it is variable with the particular kind of the polymer (A), the kind and amount of the polymerization inhibitor, and the oxygen concentration in the reactive atmosphere. In due consideration of the stability of the polymerizable unsaturated group possessed by the unsaturated aziridine compound (B), the stability of the reactive polymer, and the coloration of this polymer, the upper limit is fixed at 150° C. Preferably, therefore, the range of reaction temperature is 50° to 130° C. in the case of the unsaturated activated aziridine compound (B1) and 40° to 110° C. in the case of the unsaturated basic aziridine compound (B2).

When the free carboxylic group-containing polymer (A) used in the reaction has low fluidity or when the addition of the unsaturated aziridine compound (B) to the reaction system is desired to be facilitated, use of a diluent in the polymer (A) and/or the unsaturated aziridine compound (B) proves to be a desirable measure. This diluent is required to be a compound which is capable of dissolving or dispersing both the polymer (A) and the unsaturated aziridine compound (B) or, when the compound (C) is additionally used therewith, all the three compounds involved. Typical examples of the dilutent answering the description include aromatic hydrocarbons such as benzene, toluene, xylene and chlorobenzene; dioxane, ketones such as methyl ethyl ketone, acetone and methyl isobutyl ketone; esters such as ethyl acetate and butyl acetate; glycol ethers, carbitols, alcohols; and water. Such polymerizable monomers as styrene, acrylonitrile, methacrylonitrile, acrylamide, vinyl acetate, acrylic esters and methacrylic esters.

Introduction of molecular oxygen into the reaction system for the purpose of safely working this invention for the manufacture of a reactive polymer and addition of a known polymerization inhibitor such as hydroquinone, methoquinone or phenothiazine to the reaction system before or after the reaction for the purpose of conferring lasting stability upon the reactive polymer are desirable embodiments.

The reactive polymer obtained by this invention as described above is, either alone or in conjunction with a radically polymerizable compound, treated by the combination of a radical polymerization initiator such as an organic peroxide or an azo compound or a photoinitiator with exposure to ultraviolet light or to electron beam and optionally further treated with a known additive such as a filler or a coloring agent to produce adhesive composition; paint; vehicle for printing ink; or molding material for artificial marble, cast articles and polymer concrete. In these products the reactive polymer exhibits its outstanding properties.

The radical polymerization initiator fulfils its part sufficiently in a catalytic amount, normally on the order to 0.01 to 15% by weight, preferably 0.02 to 10% by weight, based on the total amount of the reactants mentioned previously. Typical examples of the radical polymerization initiator are di-t-butyl peroxide, cumene hydroperoxide, t-butyl peroxide, isobutyl peroxide, diisopropyl peroxydicarbonate, lauroyl peroxide, benzoyl peroxide, cyclohexanone peroxide, dicumyl peroxide 2,2'-azobis-isobutyronitrile, 2,2'-azobis-(2,4-dimethylvaleronitrile), 2,2'-azobis-(4-methoxy-2,4-dimethylvaleronitrile), 1,1'-azobis-(cyanocyclohexane) and dimethyl-2,2'-azobis(isobutyrate).

In order to promote the reaction, various promotors can be used in cooperation with the radical polymerization initiator. Typical promotors are mercaptans such as lauryl mercaptan; tertiary amines such as dimethyl aniline, diethyl aniline and dimethyl paratoluidine; quaternary ammonium compounds; sulfur-containing comounds such as tetramethyl thio urea and 1,3-dibutyl thiourea; metal soaps such as cobalt naphthenate, manganese naphthenate and manganese octenate; and metal chelate compounds such as vanadyl acetylcetonate and cobalt acetylacetenete.

The photoinitiator fulfils its part sufficiently in a catalytic amount, normally on the order of 0.05 to 20% by weight, preferably 0.5 to 10% by weight, based on the total amount of the reactants. Typical examples of the photoinitiator are benzoins such as benzoin methyl ether, benzoin ethylether, benzoin isopropylether and α-methyl benzoin; benzophenones such as benzophenone, 2-methyl benzophenone, dimethoxyphenyl acetophenone, p-chlorobenzophenone and p-dimethylamino benzophenone; anthraquinones such as 1-chloroanthraqunone, 2-chloroanthraquinone, 2-methyl anthraquinone and 2-ethyl anthraquinone; sulfur-containing compounds such as diphenyl disulfide, tetramethylthiouran disulfide, 2-chlorothixanthone and methylthioxanthone; and amino compounds such as methyl N,N-dimethyl anthranylate, ethyl dimethylamino benzoic acid and dimethyl aminoethanol.

Any of the radically polymerizable compounds which are capable of dissolving or dispersing the aforementioned reactive polymer can be used effectively. The selection may be suitable effected by taking into due consideration the physical properties the cured product is expected to manifest in the intended use or the workability with which the reactive polymer is adapted for the intended use. Examples of the radically polymerizable compound are radically polymerizable vinyl monomers, e.g., acrylic esters such as methyl acrylate, ethyl acrylate, propyl acrylate, isopropyl acrylate, butyl acrylates, 2-ethylhexyl acrylate, n-octyl acrylate and cyclohexyl acrylate; methacrylic esters such as methyl methacrylate, ethyl methacrylate, propyl methacrylate, butyl methacrylate, octyl methacrylate and cyclohexyl methacrylate; unsaturated nitriles such as acrylonitrile, methacrylonitrile; aromatic vinyl compounds such as styrene, α-methyl styrene and vinyl toluene; vinyl esters such as vinyl acetate; unsaturated acids such as acrylic acid, methacrylic acid, maleic acid, fumaric acid and itaconic acid; unsaturated amides such as acrylamide, methacrylamide, hydroxyalkyl (meth)acrylates such as 2-hydroxyethyl acrylate, 2-hydroxypropyl acrylate, 3-hydroxypropyl acrylate, 2-hydroxyethyl methacrylate, 2-hydroxypropyl methacrylate and 3-hydroxypropyl methacrylate; and alkoxyalkyl (meth)acrylates such as methoxyethyl acrylate, ethoxyethyl acrylate, methoxypropyl acrylate and methoxyethyl methacrylate; polyvalent (meth)acrylates such as ethyleneglycol diacrylate, ethyleneglycol dimethacrylate, propyleneglycol diacrylate, propyleneglycol dimethacrylate, trimethylolpropane triacylate, trimethylolpropane trimethacrylate, diethyleneglycol diacrylate, diethyleneglycol dimethacrylate, hydrogenated bisphenol A di(meth)acrylate and bisphenol A diethoxy di(meth)acrylate; polyvalent vinyl estes; divinyl benzene; polyester (meth)acrylates; polyurethane (meth)acrylates; polyether (meth)acrylates; epoxy (meth)acrylates; homo-oligomers and co-oligomers of such monomers.

The amount of the radically polymerizable compound is in the range of 0 to 95 parts by weight to 100 to 5 parts by weight of the aforementioned reactive polymer.

The product which is obtained by combining the reactive polymer of this invention with such a radically polymerizable comound as described above and curing the resultant mixture sufferes less curing strain than the product obtained by having one or more reactive monomers graft polymerized or block polymerized with the reactive polymer throught the medium of the reaction group of the polymer and curing the resultant graft polymer or block polymer. This product possesses toughness and other properties never attainable by copolymerization or blending of monomers.

As a typical use of this principle, the adhesive agent may be cited. The reactive polymer of this invention can be used as one component for the composition of a cold curing modified acrylic adhesive agent (otherwise called a "second-generation adhesive") obtained by polymerizing a reactive monomer with a free radical generator. In this case, polybutadiene type rubber or polyacrylic ester may be used as the polymer (A) which forms the skeleton of the reactive polymer. The reactive polymer can be applied similarly to the photo-curing type adhesive composition otherwise called a "third-generation adhesive."

As the filler, any of the known fillers such as calcium carbonate, titanium dioxide, alumina trihydrate, aggregate for mortar, aggregate for concrete and marble chips may be used. As the coloring agent, any of the various coloring agents for liquid resins may be used.

If an elastomer having a glass transition temperature (Tg) in the range of $-80°$ to $+25°$ C. is used as the reactive polymer of this invention, then this reactive polymer may be used alone or in conjunction with a radically polymerizable compound to produce adhesive composition, paint, ink or molding material. The elastomer imparts flexibility or impact resistance to these products when they are cured. To obtain this elastomer, polybutadiene type rubber, acrylic rubber or polyether type rubber having a free carboxylic group is used as the polymer (A). The glass transition temperature (Tg) may be found by actual measurement or calculated by the method described in Fox: "Bull. Am. Physics Soc." Vol. 1, No. 3, p. 123 (1956).

When a polymer having a glass transition temperature (Tg) in the range of $-80°$ to $+25°$ C. is used as a reactive polymer, a monomer component comprising a preponderance of methyl methacrylate is used as a radically polymerizable compound and they are combined in proportions such as to produce a methyl methacrylate type curing composition containing the reactive polymer in a concentration of 5 to 30% by weight, this compostion, on being cast and cured, gives rise to a shaped article of acrylic resin such as, for example, an acrylic resin plate excelling in impact resistance.

When this methyl methacrylate type curing composition and aggregate for mortar and/or aggregate for concrete are mixed in a ratio of 5 to 90% by weight of the composition to 95 to 10% by weight of the aggregate, the resultant mixture, on being cured, gives rise to a polymer concrete composition excelling in impact resistance. When the methyl methacrylate type curing composition and alumina trihydrate are mixed in a ratio of 85 to 15% by weight of the composition to 15 to 85% by weight of the alumina trihydrate, the resultant mixture, on being cured, gives rise to artificial marble which retards combustion and assumes an appearance of depth peculiar to natural rock.

Further, the reactive polymer obtained by this invention may be used in its unaltered form as an agent for diminishing shrinkage or profile in sheet molding compounds or bulk molding compounds using unsaturated polyester resin. In this case, the reactive polymer fulfils its part sufficiently even when it has a glass transition temperature outside the range of $-80°$ to $+25°$ C. When the reactive polymer having a glass transition temperature in this range is used, it imparts enhanced impact resistance to the produced shaped article.

Now, the present invention will be described in further detail below with reference to working examples. Whenever "part" is mentioned in the following working examples, it is meant as parts by weight unless otherwise specified.

EXAMPLE 1

In a reactor provided with a stirrer, a condenser, a thermometer and a dropping funnel, 250 parts of liquid polybutadiene dicarboxylic acid having a free carboxylic group content of 1.48 milliequivalent/g (produced by Nippon Soda Co, Ltd. and marketed under trademark disignation of "NISSO-PB-C-1000") was placed and adjusted by stirring to 60° C. Then 31.6 parts of 2-(1-aziridinyl)ethyl methacrylate (produced by Nippon Shokubai Kagaku Kogyo Co., Ltd. and marketed under trademark designation of "Chemitite MZ-11") was continuously introduced dropwise through the dropping funnel over a period of three hours and retained at the same temperature as described above for three hours. Thereafter, the reaction mixture was cooled to obtain a product. This product, when analyzed by titration for carboxylic group concentration, was indentified to be liquid polybutadiene having 48% of the free carboxylic group in the raw material converted to an unsaturated group.

EXAMPLE 2

The procedure of Example 1 was faithfully repeated, except that 41.0 parts of N-methyacryloyl aziridine was used in the place of 31.6 parts of "Chemitite MZ-11." The product, when analyzed by titration for carboxylic group concentration, was identified to be liquid polybutadiene having 93% of the free carboxylic group in the raw material converted into an unsaturated group.

EXAMPLE 3

The procedure of Example 1 was faithfully repeated, except that in the place of 31.6 parts of "Chemitite MZ-11," a mixture of 57.4 parts of "Chimitite MZ-11" and 31.5 parts of n-propyl isocyanate was added dropwise to afford a product. The product, when analyzed by titration for carboxylic group concentration, was identified to be liquid polybutadiene having 98% of the free carboxylic group in the raw material converted into an unsaturated group.

EXAMPLE 4

The procedure of Example 3 was faithfully repeated, except that 15.6 parts of ketene dimer was used in the place of 31.5 parts of n-propyl isocyanate, to afford a product. This product, when analyzed by titration for carboxylic group concentration, was identified to be liquid polybutadiene having 98% of the free carboxylic group in the raw material converted into an unsaturated group.

EXAMPLE 5

In a reactor provided with a stirrer, a condenser, a thermometer and a dropping funnel 500 parts of xylene solution containing 40% by weight of alkyd resin having a free carboxylic group content of 1.0 milliequivalent/g and obtained from glycerol, phthalic anhydride and fatty acid by an ordinary method was placed and adjusted by stirring to 90° C. Then 15.5 parts of N-methacryloyl aziridine was continuously introduced dropwise through the dropping funnel over a period of 1.5 hours and was retained at the same temperature as described above for four hours and cooled, to afford a product containing 41% by weight of resin. When the resin component of the product was analyzed by titration for carboxylic group concentration, it was confirmed that 47% of the free carboxylic group in the raw material had been converted into a reactive unsaturated group.

EXAMPLE 6

In a reactor provided with a stirrer, a condenser, a thermometer and a dropping funnel, 200 parts by aqueous dispersion of 50% by weight of resin obtained by known emulsion polymerization method and having a monomer composition of acrylonitrile/butyl acrylate/acrylic acid=13.5/81.5/5.0 (by weight) and a free carboxylic group content of 0.69 milliequivalent/g was placed and adjusted by stirring to 70° C. Then, 5.4 parts of "Chemitite MZ-11" was continuously introduced dropwise through the dropping funnel over a period of 1.5 hours, then maintained at the same temperature as described above for four hours, and cooled, to afford an aqueous dispersion containing 51% by weight of resin. When the resin component of the aqueous dispersion was analyzed by titration for carboxylic group concentration, it was confirmed that about 37% of the free carboxylic group in the raw material had been converted into a reactive unsaturated group.

EXAMPLE 7

In a reactor provided with a stirrer, a condenser, a thermometer and a dropping funnel, 500 parts of a toluene solution of 50% by weight of a copolymer obtained by an ordinary method and having a monomer composition of methyl methacrylate/butyl acrylate/methacrylic acid=10/80/10 (by weight) and a free carboxylic group content of 1.16 milliequivalent/g was placed and adjusted by stirring to 90° C. Then 32.2 parts of toluene solution of 50% of N-methacroyl aziridine was continuously introduced dropwise through the dropping funnel, the 16.1 parts thereof over the first one hour and the remaining 16.1 parts thereof over the subsequent two hours, then retained at the same temperature as described above for two hours, and cooled. The reaction mixture removed from the reactor was freed of toluene by means of an evaporator, to afford a product. The product, when analyzed by the HBr method for unsaturated group concentration, was found to contain a reactive unsaturated group in a concentration of 0.51 milliequivalent/g. Control 1

In a reactor provided with a stirrer, a condenser, a thermometer and a dropping funnel, 200 parts of a toluene solution of 50% by weight of a copolymer obtained by an ordinary method and having a monomer composition of methyl methacrylate/butyl acrylate/2-(1-aziridinyl)ethyl methacrylate=10/80/10 (by weight) was placed and adjusted by stirring to 60° C. Then, 5.5 parts of methacrylic acid was continuously introduced dropwise through the dropping funnel for three hours and then retained at the same temperature as described above for four hours. The reaction mixture was gelled. Thus the reactive group cannot introduced into the polymer chain safely by this method.

EXAMPLE 8–12

The procedure of Example 7 was faithfully repeated, except that a varying unsaturated aziridine compound indicated in the following table was used in the place of N-methacryloyl aziridine, to afford a product. The product was identified to be a polymer containing a reactive unsaturated group as indicated in table 1.

TABLE 1

| | Unsaturated aziridine compound | | Result of analysis, |
|---|---|---|---|
| Example | Compound | Amount (parts) (as 50% toluene soln.) | Concentration of unsaturated group in polymer (m mol/g) |
| 8 | 1-allyl aziridine<br>$CH_2=CH-CH_2-N\triangleleft$ | 43.2 | 0.51 |
| 9 | 1-[2-(p-styryl)ethyl]aziridine<br>$CH_2=CH-\langle\bigcirc\rangle-CH_2CH_2-N\triangleleft$ | 40.1 | 0.51 |
| 10 | 1-vinyl sulfonyl aziridine<br>$CH_2=CH-SO_2-N\triangleleft$ | 16.0 | 0.14 |
| 11 | N—(p-styryl)1-aziridinyl carboxyamide<br>$CH_2=CH-\langle\bigcirc\rangle-NHCO-N\triangleleft$ | 80.0 | 0.72 |
| 12 | N—2-acryloyl oxyethyl-1-aziridinyl carboxyamide<br>$CH_2=CH-COOCH_2CH_2-NHCO-N\triangleleft$ | 98.6 | 0.92 |

EXAMPLE 13

In a reactor provided with a stirrer, a condenser, a thermometer and a dropping funnel, 500 parts of methyl methacrylate solution of 50% by weight of a copolymer obtained by an ordinary method and having a monomer composition of methyl methacrylate/styrene/butyl acrylate/methacrylic acid=5/5/85/5 (by weight) and a free carboxylic group content of 0.58 milliequivalent/g and a glass transition temperature of −41.5° C. was placed and adjusted by stirring to 90° C. Then, 16 parts of methyl methacrylate solution of 50% by weight of N-methacroyl aziridine containing 100 ppm of phenothiazine was continuously introduced dropwise through the dropping funnel over a period of three hours, then retained at the same temperature as described above, and cooled, to afford a methyl methacrylate solution containing 50% by weight of resin. When the resin component of the solution was analyzed by titration for carboxylic group concentration, it was found that about 35% of the free carboxylic group in the copolymer as the raw material had been converted into a reactive unsaturated group.

EXAMPLE 14

The procedure of Example 13 was faithfully repeated, except that 16 parts of methyl methacrylated solution of 50% by weight on N-methacroyl aziridine was changed to 22.3 parts of methyl methacrylate solution of 50% by weight of "Chemitite MZ-11" and the reaction temperature was changed from 90° C. to 70° C., to afford a methyl methacrylate solution containing 50% by weight of resin. When the resin component of the solution was analyzed by titration for carboxylic group concentration, it was confirmed that about 40% of the free carboxylic group in the copolymer as the raw material had been converted into a reactive unsaturated group.

EXAMPLE 15

The procedure of Example 13 was faithfully repeated, except that 16 parts of methyl methacrylate solution of 50% by weight of N-methacroyl aziridine was changed to 40.8 parts of methyl methacrylate solution containing 11.3 parts of "Chemitite MZ-11" and 9.1 parts of cyclohexyl isocyanate in a combined concentration of 50% by weight, to afford a methyl methacrylate solution of 50% by weight of resin. When the resin component of the solution was analyzed, it was confirmed that about 43.5% of the free carboxylic group in the raw material had been converted into a reactive unsaturated group.

EXAMPLE 16

In a reactor provided with a stirrer, a condenser, a thermometer and a dropping funnel, 85 parts of carboxylated acrylonitrile-butadiene rubber (made by Nippon Zeon Co., Ltd. and marketed under trademark designation of Nipol-1072B) having a free carboxyl group content of 0.71 milliequivalent/g, 100 parts of methyl methacrylate and 0.001 part of phenothiazine were placed and left standing overnight to effect swelling and then stirred at 90° C. to effect dissolution of rubber. The mixture in the reactor was adjusted to 70° C. Then, 46.8 parts of methyl methacrylate solution containing 10% by weight of "Chemitite MZ-11" was continuously introduced dropwise through the dropping funnel, the 23.4 parts thereof over the first one hour and the remaining 23.4 parts thereof over the subsequent two hours, then retained at the same temperature as described above for three hours, and cooled, to afford a methyl methacrylate solution containing 38.5% by weight of resin. When the resin component of the solution was analyzed by titration for carboxylic group concentration, it was confirmed that about 45% of the free carboxylic group in the rubber as the raw material had been converted into a reactive unsaturated group.

EXAMPLES 17-18 AND CONTROL 2

Compositions for cast polymerization were prepared in the following formulation by using the methyl methacrylate solutions of reactive polymers obtained in Examples 13 and 15.

Formulation of composition

| | |
|---|---|
| Methyl methacrylate solution of 50% of reactive polymer | 36 parts |
| Methyl methacrylate | 64 parts |
| Azo-bis-isobutylonitrile | 0.2 part |

Then, the compositions were each cast between two glass sheets opposed to each other as spaced by a gasket made of vinyl chloride resin and set in situ in a bath of hot water at 60° C. They were left standing in this condition for five hours, then kept exposed to a current of hot air at 110° C. to complete the polymerization proceeding therein, cooled and released from the molds. Consequently, there were obtained transparent cured sheets 3 mm in thickness. They were found to be acrylic resin sheets of improved impact resistance as shown in the following table.

Separately, compositions which were prepared by replacing the reactive polymers in the compositions described above each with the same amount of the copolymer obtained in Example 13 were treated by following the procedures of Examples 13 and 15, to afford acrylic sheets. These acrylic sheets were found to possess low impact resistance as shown in the following table. In table 2, the numerical values given in the bracket titled (Reference) represent the test results of a sheet of homopolymer of methyl methacrylate obtained by the procedure described above.

TABLE 2

| | Polymer used in composition | Total light transmittance (%) | Hardness test by means of pencils (under load of 100 g) | Izod impact (kg-cm/cm without notch) |
|---|---|---|---|---|
| Example 17 | Reactive polymer obtained in Example 13 | 92.1 | 2H | 130 |
| Example 18 | Reactive polymer obtained in Example 15 | 92.8 | 2H | 113 |
| Control 2 | Copolymer obtained in Example 13 | 43.5 | HB | 31 |
| Reference | | 93.1 | 2H | 23 |

*Total light transmittance: ASTM D 1003
Hardness test by means of pencils: JIS D 0202
Izod impact: ASTM D 256

EXAMPLE 19

A composition for concrete floor of the following formulation was prepared by using the product obtained in Example 7.

Premix

| | |
|---|---|
| Product obtained in Example 7 | 30% by weight |
| Methyl methacrylate | 35% by weight |
| Butyl methacrylate | 25% by weight |
| Tetraethylene glycol dimethacrylate | 5% by weight |
| Hydroxyethyl methacrylate | 3% by weight |
| Paraffin wax | 0.5 by weight |
| Tetramethyl thiourea | 1.5 by weight |

Composition for concrete floor

| | |
|---|---|
| Premix mentioned above | 40 parts |
| Titanium dioxide | 5 parts |
| Finely divided calcium carbonate | 10 parts |

-continued

| | |
|---|---|
| Silica sand | 45 parts |

On a concrete floor having the surface thereof primed with epoxy resin, 100 parts of the composition mentioned above quickly mixed with 2 parts of cumene hydroperoxide was cast to a thickness of 2 mm. In above 30 minutes, the coating was completely cured, to produce a glossy, smooth concrete floor showing absolutely no sign of cracks due to shrinkage during the curing.

EXAMPLE 20 AND CONTROL 3

A room-temperature two-component curing adhesive composition of the following formulation was prepared by using the methyl methacrylate solution of reactive rubber obtained in Example 16.
Adhesive composition

| | Component 1 | Component 2 |
|---|---|---|
| Solution obtained in Example 16 | 22.1 parts | 22.1 parts |
| Hydroxyethyl methacrylate | 22.25 parts | 22.25 parts |
| Methacrylic acid | 5.4 parts | 5.4 parts |
| Wax | 0.05 parts | 0.05 parts |
| Cumene hydroperoxide | 3.0 parts | — |
| Tetramethyl thiourea | — | 1.0 parts |

Then two iron sheets were prepared. Component 1 and Component 2 were each applied to the opposed surfaces of the two iron sheets and the opposed surfaces now wet with the components were applied to each other. After elapse of five minutes, the two iron sheets were joined so fact to each other that they could not be separated with hands. By the meaurement performed one hour thereafter, the tensile shear bond strength (ASTM D 1002) was found to be 240 kg/cm$^2$ and the impact strength (ASTM D 950) to be not less than 45 kg.cm/cm$^2$.

Separately a composition which was prepared by replacing only the reactive rubber in the composition mentioned above with the same amount of Nipol 1072B was tested for adhesive properties by following the procedure of Example 20. Consequently, the tensile shear bond strength was found to be 90 kg/cm$^2$ and the impact strength to be 15 kg.cm/cm$^2$.

EXAMPLE 21

A composition of the following formulation intended for production of a cured article resembling artificial marble was prepared by using the reactive polymer obtained in Example 7.
Composition

| | |
|---|---|
| Reactive polymer of Example 7 | 15 parts |
| Methyl methacrylate | 85 parts |
| Alumina trihydrate | 150 parts |
| Cumyl hydroperoxide | 0.5 part |
| Dimethyl aniline | 0.01 part |

The composition was placed between two galss sheets, left standing overnight at room temperature to be cured, then heated at 80° C. for two hours for further curing, and released from the mold. Consequently, there was obtained a cured sheet 4.5 mm in thickness. This sheet had an appearance of glossy marble stone. When the sheet was cut with a diamond cutter operated at a high rotary speed, the cut section showed absolutely no discernible chipping. This the sheet enjoyed good fabricability.

Further, combustion test (ASTM E 286-65T) was carried out. As the result, steiner tunnel value was 47.

EXAMPLE 22

An ultraviolet curing composition was prepared by adding 3 parts of benzoin propyl ether to 100 parts of the product obtained in Example 2. This composition was applied in a thickness of 0.5 mm on a Teflon sheet and cured by five minutes' exposure to the ultraviolet light from an ultraviolet lamp 2 kW, 80 W/cm kept at a distance of 8 cm. By peeling the cured coating from the Teflon sheet, there was obtained a film having tack-free surface. The cured film was insoluble in acetone and benzene.

EXAMPLE 23

A thermosetting composition was prepared by adding 2 parts of benzoyl peroxide to 100 parts of the product obtained in Example 3. This composition was applied in a thickness of 20 $\mu$m to an iron sheet and baked at 110° C. under an atmosphere of nitrogen. Consequently, there was obtained a cured surface having tack-free property. The coating showed resistance to water and was effective in protecting the iron sheet.

EXAMPLE 24

A photocuring composition of the following formulation was prepared by using the product obtained in Example 12.
Composition

| | |
|---|---|
| Product of Example 12 | 100 parts |
| Methyl methacrylate | 200 parts |
| 2-Hydroxyethyl acrylate | 50 parts |
| Acrylic acid | 10 parts |
| Benzoin methyl ether | 5 parts |

This composition was applied in a thickness of 20 $\mu$m on a tinplate and kept exposed for 2 minutes to the ultraviolet light from an ultraviolet lamp 800 W kept at a distance of 15 cm. The coating was completely cured to produce a coated plate excellent in film-adhesiveness and bending property.

EXAMPLE 25 AND CONTROL 4

A press molding composition of the following formulation was prepared by using the reactive polymer obtained in Example 9 in a 45% styrene solution of an unsaturated polyester resin produced from phthalic anhydride, maleic anhydride and ethylene glycol by an ordinary method.
Composition

| | |
|---|---|
| Styrene solution of unsaturated polyester resin | 35 parts |
| Reactive polymer obtained in Example 9 | 5 parts |
| Calcium carbonate powder | 40 parts |
| Glass fibers (2 inches) | 19 parts |
| Zinc stearate | 0.5 part |
| t-Butyl peroxybenzoate | 0.5 part |
| Magnesium oxide | 0.5 part |

This composition was uniformly interposed between two sheets of polypropylene film, left standing in situ for one day, and then pressed under pressure of 50 kg/cm$^2$ at a temperature of 140° C. for four minutes.

Consequently, there was obtained a shaped article. It showed a cure shrinkage of 0.08%, indicating that the press molding composition excelled in dimensional stability.

Separately, a composition was prepared by replacing the reactive polymer of Example 9 in the aforementioned composition with the same amount of polystyrene. Wnen this composition was tested for the curing property by following the same procedure, it showed a curing shrinkage of 0.2%, indicating that the composition possessed poor dimensional stability.

EXAMPLE 26

An ultraviolet curing adhesive composition of the following formulation was prepared by using the reactive polymer obtained in Example 1.
Composition

| Reactive polymer obtained in Example 1 | 40.0 parts |
|---|---|
| Tetraethylene glycol diacrylate | 20.0 parts |
| Ethyleneglycol phthalate acrylate | 5.0 parts |
| Dimethoxy phenyl acetophenone | 3.0 parts |
| Methylene dichloride | 60.0 parts |

This composition was spread with a bar coater, No. 6, on a defatted steel plate and left standing for 10 minutes at room temperature to expel the solvent. Then, a transparent film formed in a thickness of 50 μm preponderantly of methyl methacrylate and butyl methacrylate was superposed thereon under pressure. The superposed layers on the steel plate were exposed for 90 seconds to the ultraviolet light from an ultraviolet lamp 800 W kept at a distance of 10 cm. The acrylic film was consequently joined fast to the steel plate, giving rise to a coated steel plate excellent in bending property.

What is claimed is:

1. A reactive polymer containing at least one radically polymerizable unsaturated group obtained by causing (A) a polymer containing free carboxylic groups in an acid equivalent of 0.01 to 5 milliequivalent/g to react with (B) for 0.05 to 1.2 mole of an unsaturated aziridine compound possessing one aziridinyl group and at least one radically polymerizable unsaturated group in the molecular unit thereof per 1.0 mole of free carboxylic group of said polymer under esterification conditions to form esters between said free carboxylic groups and said aziridine groups.

2. A reactive polymer according to claim 1, wherein said unsaturated aziridine compound is an unsaturated activated aziridine compound.

3. A reactive polymer according to claim 1, wherein said unsaturated aziridine compound is an unsaturated basic aziridine compound.

4. A reactive polymer obtained by causing (A) a polymer containing a free carboxylic group in an acid equivalent of 0.01 to 5 milliequivalent/g, (B2) an unsaturated basic aziridine compound possessing one aziridinyl group and at least one radically polymerizable unsaturated group in the molecular unit thereof, and (C) at least one compound selected from the group consisting of monoisocyanates, monothioisocyanates, ketenes and ketene dimers to react with one another in proportions such that the amount of said unsaturated basic aziridine compound (B2) falls in the range of 0.05 to 1.0 mole per 1.0 mole of said free carboxylic group of said polymer (A) and the amount of said compound (C) falls in the range of 0.8 to 1.2 mole per 1.0 mole of said unsaturated basic aziridine compound (B2).

5. A reactive polymer according to claim 4, wherein said compound (C) is a monoisocyanate.

6. A reactive polymer according to calim 4, wherein said compound (C) is a ketene or ketene dimer.

7. A method for the manufacture of a reactive polymer, which comprises causing (A) a polymer containing a free carboxylic group in an acid equivalent in the range of 0.01 to 5 milliequivalent/g and (B) an unsaturated aziridine compound possessing one aziridinyl group and at least one radically polymerizable unsaturated group in the molecular unit thereof to react with each other in proportions such that the amount of said unsaturated aziridine compound falls in the range of 0.05 to 1.2 mole per 1.0 mole of said free carboxylic group of said polymer at a temperature in the range of 40° to 150° C.

8. A method according to claim 7, wherein said unsaturated aziridine compound (B) is a compound represented by the general formula I:

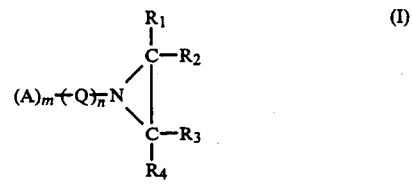

wherein A denotes one group selected from the class consisting of $CH_2=CH-$, $CH_2=C(CH_3)-$ and $CH_2=CH-CH_2-$, m denotes an integer of 1 to 3 n denotes 0 or 1, $R_1$ through $R_4$ independently denote one member selected from the class consisting of hydrogen atom and alkyl groups of 1 to 4 carbon atoms and may be similar or dissimilar to one another, and Q denotes a multifunctional group of the valency of $(m+1)$.

9. A method according to claim 7, wherein said unsaturated aziridine compound (B) is an unsaturated activated aziridine compound (B1), the amount of said unsaturated activated aziridine compound (B1) falls in the range of 0.05 to 1.0 mole per 1.0 mole of said free carboxylic group of said polymer (A), and the rection temperature is in the range of 50° to 130° C.

10. A method according to claim 7, wherein said unsaturated aziridine compound (B) is an unsaturated basic aziridine compound (B2), the amount of said unsaturated basic aziridine compound (B2) falls in the range of 0.05 to 1.2 mole per 1.0 mole of said free carboxylic group of said polymer (A), and the reaction temperature is in the range of 40° to 110° C.

11. A method according to claim 9, wherein said unsaturated activated aziridine compound (B1) is a compound represented by the general formula III:

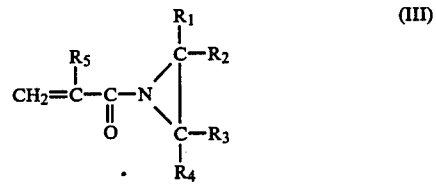

wherein $R_1$ through $R_4$ have the same meanings as defined in claim 8, and $R_5$ denotes hydrogen atom or methyl group.

12. A method according to claim 10, wherein said unsaturated basic aziridine compound (B2) is a compound represented by the general formula II:

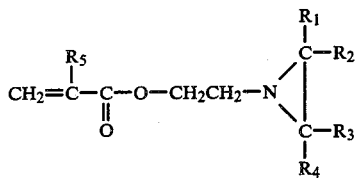

wherein $R_1$ through $R_5$ have the same meanings as defined in claim 8 and claim 11.

13. A method according to claim 11, wherein $R_1$ through $R_4$ independently denote hydrogen atom or alkyl group of 1 to 2 carbon atoms.

14. A method according to claim 12, wherein $R_1$ through $R_4$ independently denotes hydrogen atom or alkyl group of 1 to 2 carbon atoms.

15. A method according to claim 10, wherein the reaction is carried out in the presence of (C) 0.8 to 1.2 mole, based on 1.0 mole of said unsaturated basic aziridine compound (B2), of at least one compound (C) selected from the group consisting of monoisocyanates, monothioisocyanates, ketenes and ketene dimers.

16. A method according to claim 15, wherein said compound (C) is a monoisocyanate.

17. A method according to claim 15, wherein said compound (C) is a ketene or a ketene dimer.

18. A curing composition, comprising a reactive polymer set forth in claim 1 and a catalytic amount of a radical polymerization initiator.

19. A curing compostion according to claim 18, which further comprises a radically polymerizable compound in an amount of up to 95 parts by weight to 5 to 100 parts by weight of said reactive polymer.

20. A curing composition according to claim 19, wherein said reactive polymer has a glass transition temperature in the range of $-80°$ to $+25°$ C.

21. An adhesive composition consisting essentially of, as a principal component, a curing composition according to claim 18, claim 19 or claim 20 and a polybutadiene type rubber or polyacrylic ester.

22. A methyl methacrylate type curing composition according to claim 19, wherein said radically polymerizable compound comprises a major portion by weight of methyl methacrylate and said reactive polymer accounts for 5 to 30% by weight of the total amount of the composition.

23. An article of methyl methacrylate type resin, obtained by molding a curing composition set forth in claim 22 in a given shape and subsequently curing the molded composition by application of heat.

24. A polymer concrete composition, comprising a methyl methacrylate type curing composition of claim 22 and at least one aggregate selected from the group consisting of aggregate for mortar and aggregate for concrete, at a ratio of 5 to 90% by weight of said curing composition to 95 to 10% by weight of said aggregate.

25. An article of polymer concrete, obtained by molding a polymer concrete composition set forth in claim 24 in a given shape and subsequently curing the molded composition by application of heat.

26. A curing composition, comprising a methyl methacrylate type curing composition set forth in claim 22 and alumina trihydrate, at a ratio of 85 to 15% by weight of the former to 15 to 85% by weight of the latter.

27. An article, obtained by molding a curing composition set forth in claim 26 in a given shape and subsequently curing the molded composition by application of heat.

28. A photo-curing composition, comprising a reactive polymer set forth in claim 1 and a catalytic amount of a photoinitiator.

29. A photo-curing composition according to claim 28, wherein a radically polymerizable compound is contained in an amount of up to 95 parts by weight to 5 to 100 parts by weight of said reactive polymer.

30. A photo-curing composition according to claim 28 or 29, wherein said reactive polymer has a glass transition temperature in the range of $-80°$ to $+25°$ C.

31. A curing compositin, comprising a reactive polymer set forth in claim 4 and a catalytic amount of a radical polymerization initiator.

32. A curing composition according to claim 31, which further comprises a radically polymerizable compound in an amount of 95 to 0 parts by weight to 5 to 100 parts by weight of said reactive polymer.

33. A curing composition according to claim 32, wherein said reactive polymer has a glass transition temperature in the range of $-80°$ to $+25°$ C.

34. An adhesive composition having as a principal component thereof a curing composition according to claim 31, claim 32 or claim 33.

35. A curing composition according to claim 32, wherein said radically polymerizable compound comprises a major portion by weight of methyl methacrylate and said reactive polymer accounts for 5 to 30% by weight of the total amount of the composition.

36. An article of methyl methacrylate type resin, obtained by molding a methyl methacrylate type curing composition set forh in claim 35 in a given shape and subsequently curing the molded composition by application of heat.

37. A polymer concrete composition, comprising a methyl methacrylate type curing composition of claim 35 and at least one aggregate selected from the group consisting of aggregate for mortar and aggregate for concrete, at a ratio of 5 to 90% by weight of said curing composition to 95 to 10% by weight of said aggregate.

38. An article of polymer concrete, obtained by molding a polymer concrete composition set forth in claim 37 in a given shape and subsequently curing the molded composition by application of heat.

39. A curing composition, comprising a methyl methacrylate type curing composition set forth in claim 35 and alumina trihydrate, at a ratio of 85 to 15% by weight of the former to 15 to 85% by weight of the latter.

40. An article, obtained by molding a curing composition set forth in claim 39 in a given shape and subsequently curing the molded composition by application of heat.

41. A photo-curing composition, comprising a reactive polymer set forth in claim 4 and a catalytic amount of a photoinitiator.

42. A photo-curing composition according to claim 41, wherein a radically polymerizable compound is contained in an amount of 95 to 0 parts by weight to 5 to 100 parts by weight of said reactive polymer.

43. A photo-curing composition according to claim 41 or 42, wherein said reactive polymer has a glass transition temperature in the range of $-80°$ to $+25°$ C.

* * * * *